DAVID D. GIBSON.
Plow Colters.
No. 120,055.        Patented Oct. 17, 1871.
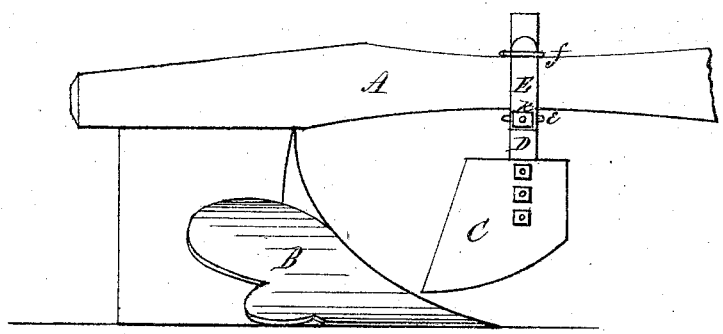
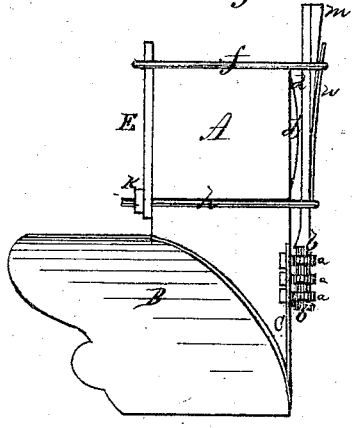
Witnesses
Jno. A. Ellis
J. T. White
Inventor
David D. Gibson
по
T. H. Alexander
Atty.

UNITED STATES PATENT OFFICE.

DAVID D. GIBSON, OF SPRINGVILLE, IOWA.

IMPROVEMENT IN PLOW-COLTERS.

Specification forming part of Letters Patent No. 120,055, dated October 17, 1871.

*To all whom it may concern:*

Be it known that I, DAVID D. GIBSON, of Springville, in the county of Linn and State of Iowa, have invented certain new and useful Improvements in Plow-Colters; and I do hereby declare that the following is a full, clear, and exact description thereof, reference being had to the accompanying drawing and to the letters of reference marked thereon, which form a part of this specification.

The nature of my invention consists in the construction and arrangement of a plow-colter, as will be hereinafter more fully set forth.

In order to enable others skilled in the art to which my invention appertains to make and use the same, I will now proceed to describe its construction and operation, referring to the annexed drawing, in which—

Figure 1 is a side view, and Fig. 2 a front view of a plow with my colter attached.

A represents the plow-beam, and B the plow proper, constructed in any of the known and usual ways. C represents the colter, constructed in quadrilateral form, as shown in Fig. 1, so as to have an angling cut. This colter is on one side provided with two or more rings, a a, through which passes a rod, b, formed on the lower end of a bar, D, said bar being held to the plow-beam by means that will be presently described. The rings or eyes a a are each formed upon the end of a short bolt, which is passed through the colter and fastened by a nut on the opposite side, so that if any one of these rings should break or become otherwise injured it can very readily be replaced by a new one at a very small expense. By means of the rings a a the colter is permitted to swing on the rod b and adjust itself. The bar D is placed alongside of the plow-beam, but between them are inserted a concave and a convex wedge, d and d', as shown in Fig. 2. On the opposite side of the plow-beam is a metal bar, E, and a stirrup, f, is placed above the plow-beam around the upper ends of the bar or shank D and the bar E. Below the plow-beam is a rod, h, with loop e on one end surrounding the shank D, while the other end passes through the lower end of the bar E and has a set-screw or nut, k, upon its end. By means of this nut or set-screw the colter or blade may be set to or from the land-side if necessary. Between the stirrup f and shank D is inserted a wedge, m, with or without the plate or bar n, to fasten the whole device to the plow-beam whatever size said beam may be; the concave and convex wedges d d' preventing its slipping in either direction.

Having thus fully described my invention, what I claim as new, and desire to secure by Letters Patent, is—

1. The quadrilateral colter C provided with rings a a, said rings being formed on the ends of small screw-bolts and fastened by nuts on the opposite side of the colter, substantially as and for the purposes herein set forth.

2. In combination with the quadrilateral colter C having rings or eyes a a, as described, the rod b formed on the lower end of the shank D, substantially as and for the purposes herein set forth.

3. In combination with the quadrilateral colter C having rings or eyes a a, and the shank D with rod b, the concave and convex wedges d d', straight wedge m, stirrup f, bar E, rod h, and set-screw k, all constructed and arranged substantially as shown and described, and for the purposes herein set forth.

In testimony that I claim the foregoing as my own I affix my signature in presence of two witnesses.

D. D. GIBSON.

Witnesses:
J. C. DAVIS,
J. V. WHITE.

(114)